(No Model.)
E. P. BOLAND.
AUTOMATIC TELEPHONE CALL DEVICE.
No. 577,911. Patented Mar. 2, 1897.
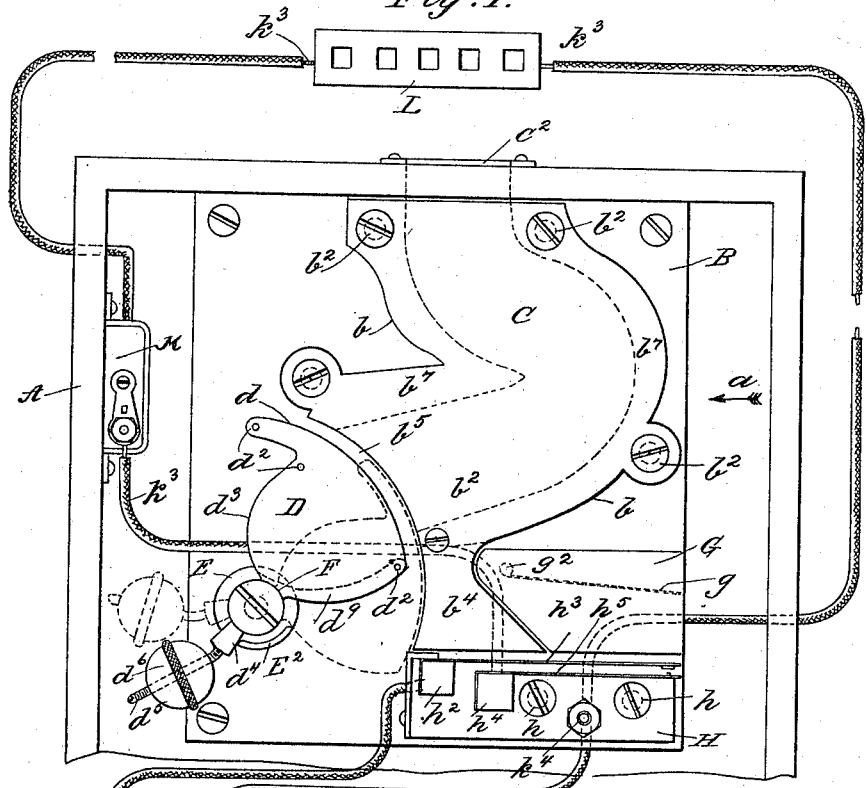
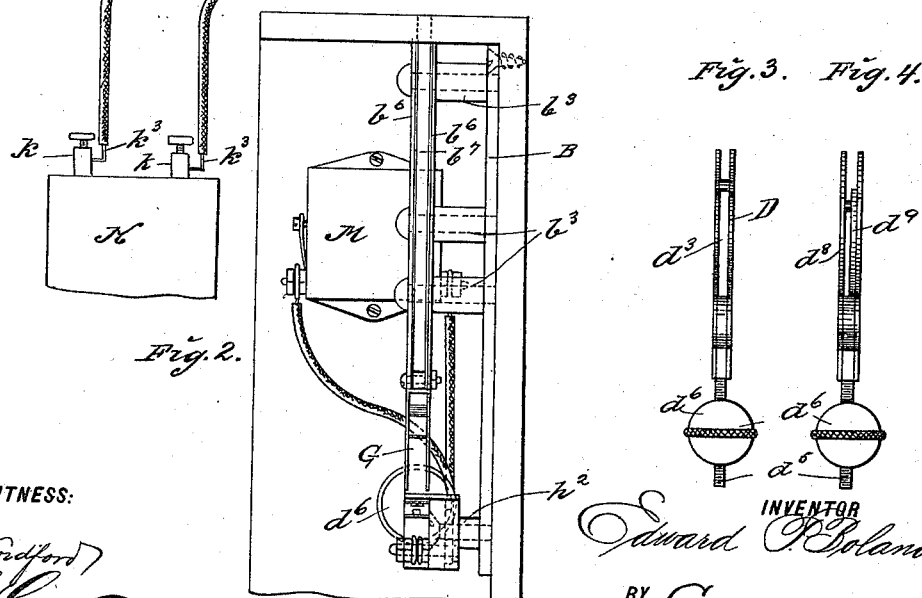
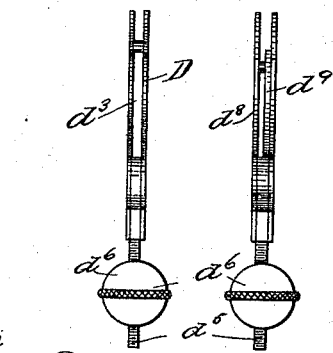
WITNESS:
INVENTOR
Edward P. Boland.
BY Edgar Tate & Co
ATTORNEYS.

UNITED STATES PATENT OFFICE.

EDWARD P. BOLAND, OF NEW YORK, N. Y.

AUTOMATIC TELEPHONE-CALL DEVICE.

SPECIFICATION forming part of Letters Patent No. 577,911, dated March 2, 1897.

Application filed April 6, 1896. Serial No. 586,463. (No model.)

*To all whom it may concern:*

Be it known that I, EDWARD P. BOLAND, a citizen of the United States, and a resident of New York, in the county of New York and State of New York, have invented certain new and useful Improvements in Automatic Telephone-Call Devices, of which the following is a specification, reference being had to the accompanying drawings, forming a part thereof, in which similar letters of reference indicate corresponding parts.

This invention relates to automatic telephone-calls; and the object thereof is to provide a telephone-call device which is adapted to be operated by a nickel or other coin and by which the central station may be called up whenever desired by simply dropping a nickel into the call device, a further object being to provide a device of this class into which the party who desires to employ a telephone or to send a message deposits the amount of the charge before using the telephone.

The invention is fully disclosed in the following specification, of which the accompanying drawings form a part, in which—

Figure 1 is an end view of the casing which constitutes or in which is placed my improved call apparatus, one side of the casing being removed and showing also a plan view of the apparatus; Fig. 2, a side view of the apparatus, looking in the direction of the arrow in Fig. 1; Fig. 3, a plan or upper side view of a coin receiver or receptacle which I employ and which constitues a part of the operating mechanism, and Fig. 4 a bottom plan view thereof.

In the practice of my invention I provide a box or casing A, which is preferably rectangular in form, and in Fig. 1 the bottom of this box or casing is broken away, only that part thereof which contains the operating apparatus being shown.

Secured to one side of the box or casing is a plate B, to which is secured a casing $b$, which is secured to said plate by screws or bolts $b^2$, on which are placed tubular bearings $b^3$, as shown in Fig. 3, the object of which is to hold the casing $b$ at a predetermined distance from the side of the box or main casing or from the plate B, as is also shown in Fig. 2.

The lower end of the casing $b$ is provided with a downwardly and outwardly directed extension $b^4$, and formed in said casing is a curved passage C, which is shown in dotted lines in Fig. 1 and which opens at the top through a plate $C^2$, in which is placed a slot which is not shown, but which is of just such dimensions as to admit of the insertion of a nickel.

The inner end of the casing $b$ is curved or segmental in form, as shown at $b^5$, and the curved passage C, which is shown in dotted lines in Fig. 1, is also of just sufficient width to allow of the passage of a nickel therethrough, and a similar passage is formed in the extension $b^4$ at the bottom of the casing $b$.

The casing $b$ is composed of two separate side plates $b^6$ and corresponding edge pieces $b^7$, one of which is shown in full lines in Fig. 2, and the positions of both of which are shown in dotted lines in Fig. 1, and I also employ a receptacle D, the body portion of which is substantially circular in form on one side, and the inner side of which is curved or segmental, as shown at $d$, so as to correspond with the adjacent end of the casing $b$, and said casing D is also composed of side plates which are bound together by rivets or screws $d^2$, and said receptacle D is adapted to receive a nickel as it rolls through the casing $b$, as hereinafter described, and mounted on the plate B, adjacent to the lower outer side of the receptacle D, is a circular plate E, having at its lower side a segmental flange $E^2$, and the receptacle D is provided with a shank $d^4$, which is provided with a screw-threaded extension $d^5$, on which is mounted a weight $d^6$, and said shank $d^4$ of the receptacle D is connected with the circular plate E by a set-screw F, which is passed therethrough.

At the right of the downwardly-directed extension $b^4$ of the casing $b$ is an oblong casing G, which is of the same thickness as the casing $b$ and the inner end of which is open, and in the operation of the device, hereinafter described, the nickel after passing through the casing $b$ into the receptacle D is dropped out of said receptacle and rolls between the sides of the extension $b^4$ into and through the casing G, and the bottom of the extension $b^4$ of the casing $b$ and also of the casing G is open.

Secured to the plate B immediately below the casing G and the extension $b^4$ of the casing $b$ is a rubber plate or block H, which is secured to the plate B by screws $h$, on which are mounted tubular sleeves $h^2$, by means of which the plate or block H is held at a predetermined distance from the plate B, so that the outer side thereof will be even with the outer side of the casings $b$ and G, and secured to the outer side and the inner end of the plate or block H is a metal stud $h^2$, to which is secured a thin flat plate-spring $h^3$, which extends parallel with and close to the bottom of the extension $b^4$ of the casing $b$ and the bottom of the casing G, and a little to the right of and slightly below the stud $h^2$ is a similar metal stud $h^4$, with which is connected a spring $h^5$, which projects parallel with the spring $h^3$.

I also employ a battery K, which is provided with the usual binding-posts $k$, which are connected with conductors $k^2$ and $k^3$. The conductor $k^3$ extends to and is in connection with a binding-post $k^4$, which passes through a plate or block H and thence through a central station L, and a conductor $k^2$ is connected with the stud $h^2$ on the plate or block H, and the conductor $k^3$ is continued through or from the station L and connected with a buzzer or bell M in the main box or casing A of the call device, or from said buzzer it extends to and connects with the stud $h^4$ on the plate or bar H, and the buzzer or bell M may be of any desired form or construction and is simply intended for giving notice that the device is in operation, and it will be understood that there is an operator at the central station, and the operation will be apparent from the foregoing description when taken in connection with the accompanying drawings and the following statement thereof.

It will also be understood that one of my improved call devices is located at various points wherever telephone-calls or public telephones are employed, and whenever a person desires to use the same he drops a nickle through the plate $C^2$, and the nickel passes through the casing $b$ into the receptacle D, and said receptacle drops into the position shown in dotted lines in Fig. 1, when the nickel rolls out through the extension $b^4$ of the casing $b$ and through the casing G onto the spring $h^3$, and this causes the outer end of said spring to contact or connect with the outer end of the spring $h^5$, and a circuit is at once completed through the buzzer or bell M and through the central station. The operator at the central station immediately answers and finds out what is required by the caller or customer, the operator communicates with the caller or customer, informing him of the amount of the charge, and he proceeds to deposit said amount in nickels in the casing or call-box, and each time a nickel is deposited therein notice is given at the station, and when the required amount is deposited the operator at the station places the caller or customer in proper connection with the party with whom he desires to communicate.

The weight $d^6$ on the screw-threaded extension $d^5$ of the shaft $d^4$ of the receptacle D may be adjusted to any desired position in order to permit of the free and perfect operation of the receptacle D, and it will be understood that this device may be made so as to be operated by dimes or any other coins.

The casing G is provided with a plate-spring $g$, which is secured at $g^2$ and which is adapted to hold the nickel in position and press it upon the spring $h^3$ when it rolls out of the receptacle D, and it will also be understood that the bottom of the main box or casing A is projected downwardly, and if a nickel or other coin drops therein it will roll off of the end of the spring $h^3$.

It is evident that changes in and modifications of the construction herein described may be made without departing from the spirit of my invention or sacrificing its advantages, and I reserve the right to make all such alterations therein as fairly come within the scope of the invention.

In Fig. 3 I have shown a top plan or upper side view of the receptacle or casing D, into which the coin drops after it passes through the passage C, and in Fig. 4 a bottom plan or lower side view thereof. Formed in the upper side of this casing or receptacle is a slot $d^8$ and in the bottom thereof a similar slot $d^8$, and the object of this construction is to provide means whereby a coin which is either larger or smaller than a nickel will be thrown out or rolled out of said casing or receptacle either through the top or bottom thereof without passing out through the front, as hereinbefore described, and thus operating the device, and I thus provide means whereby the device cannot be clogged by a coin of different size from that by which it is intended to be operated, and secured in the bottom of the receptacle or casing D is a circular or segmental plate $d^9$, by which the slot $d^8$ is formed, and the slot $d^8$ may thus be made of any desired size, the size thereof depending upon the thickness of the plate $d^9$, and, as hereinbefore stated, the operation of this casing or receptacle D may be regulated to any desired extent by the weight $d^6$, which is adjustable on the screw-threaded rod $d^5$.

Having fully described my invention, I claim as new and desire to secure by Letters Patent—

1. An automatic coin-operated telephone-call device, comprising a box or casing in which is placed a passage for coin, a pivotally-supported receptacle which is adapted to receive said coin and to eject the same, a spring onto which said coin is adapted to roll, and another spring with which the first-named spring is adapted to be brought in contact by said coin and a battery or other suitable source of electrical supply which is in circuit with said springs and the central station, substantially as shown and described.

2. An automatic coin-operated telephone-call device, comprising a box or casing in which is placed a passage for coin, a pivotally-supported receptacle which is adapted to receive said coin and to eject the same, a spring onto which said coin is adapted to roll, and another spring with which the first-named spring is adapted to be brought in contact by said coin and a battery or other suitable source of electrical supply which is in circuit with said springs and the central station, and said box being also provided with a buzzer or bell, which is also in said circuit, substantially as shown and described.

In testimony that I claim the foregoing as my invention I have signed my name, in presence of the subscribing witnesses, this 3d day of April, 1896.

EDWARD P. BOLAND.

Witnesses:
C. GERST,
M. A. KNOWLES.